United States Patent
Wei et al.

(10) Patent No.: US 10,691,009 B2
(45) Date of Patent: *Jun. 23, 2020

(54) PROJECTION METHOD, PROJECTION SYSTEM, AND PROJECTOR OF FULLY COVERING MULTI-DIRECTIONAL CIRCULAR-SCREEN THROUGH CROSS-ARRANGEMENT

(71) Applicant: Hangzhou YiYuQianXiang Technology Co., Ltd., Hangzhou (CN)

(72) Inventors: Pingting Wei, Hangzhou (CN); Ruizi Qin, Hangzhou (CN)

(73) Assignee: HANGZHOU YIYUQIANXIANG TECHNOLOGY CO., LTD., Hangzhou (CN)

( * ) Notice: Subject to any disclaimer, the term of this patent is extended or adjusted under 35 U.S.C. 154(b) by 173 days.

This patent is subject to a terminal disclaimer.

(21) Appl. No.: 15/979,394

(22) Filed: May 14, 2018

(65) Prior Publication Data
US 2018/0329284 A1 Nov. 15, 2018

(30) Foreign Application Priority Data

May 12, 2017 (CN) .......................... 2017 1 0335742
Sep. 29, 2017 (CN) .......................... 2017 1 0909685

(51) Int. Cl.
*G03B 21/60* (2014.01)
*G03B 37/04* (2006.01)
(Continued)

(52) U.S. Cl.
CPC ............. *G03B 21/60* (2013.01); *G02B 30/00* (2020.01); *G03B 21/13* (2013.01); *G03B 37/04* (2013.01);
(Continued)

(58) Field of Classification Search
CPC ........ G03B 21/00; G03B 21/10; G03B 21/58; G03B 21/60; G03B 21/145; G03B 21/147;
(Continued)

(56) References Cited

U.S. PATENT DOCUMENTS 8,328,360 B2* 12/2012 Gao ...................... G03B 21/60 353/7
9,097,968 B1* 8/2015 Acevedo ................. G06T 3/005
(Continued)

*Primary Examiner* — Sultan Chowdhury
(74) *Attorney, Agent, or Firm* — Bayramoglu Law Offices LLC

(57) ABSTRACT

The projection method obtains a circular-screen projection surface by dividing a visual platform to be projected, arranges each optical machine to be arranged according to maximum optical path distance information that each optical machine to be arranged projects an image onto each circular-screen projection surface to obtain a first projection coverage range, and adjusts the first projection coverage range according to setting parameters corresponding to each optical machine to be arranged and in accordance with a preset projection surface to obtain a second projection coverage range. The projection method calculates geometric parameters and the second projection coverage range of each optical machine to be arranged to obtain a spatial position and a rotation angle range of each optical machine to be arranged.

17 Claims, 8 Drawing Sheets

(51) Int. Cl.
*H04N 13/363* (2018.01)
*H04N 13/349* (2018.01)
*H04N 9/31* (2006.01)
*G03B 21/13* (2006.01)
*G02B 30/00* (2020.01)

(52) U.S. Cl.
CPC ......... *H04N 9/3147* (2013.01); *H04N 9/3185* (2013.01); *H04N 13/349* (2018.05); *H04N 13/363* (2018.05)

(58) Field of Classification Search
CPC .. G02B 27/017; G02B 27/22; G02B 27/0025; G02B 27/0101; G02B 27/0172
See application file for complete search history.

(56) References Cited

U.S. PATENT DOCUMENTS

2013/0300637 A1* 11/2013 Smits ................. G02B 27/0176
345/8
2017/0316607 A1* 11/2017 Khalid ................. G06T 19/006

\* cited by examiner

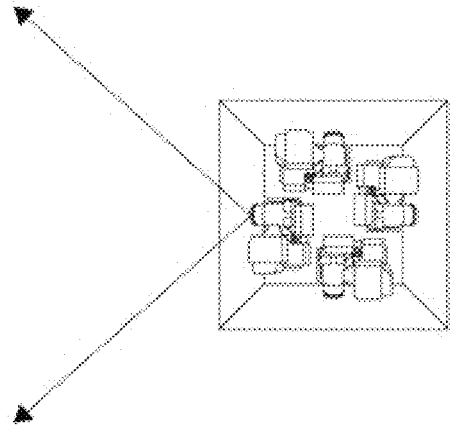
projection region of single optical machine non-cross-arrangement

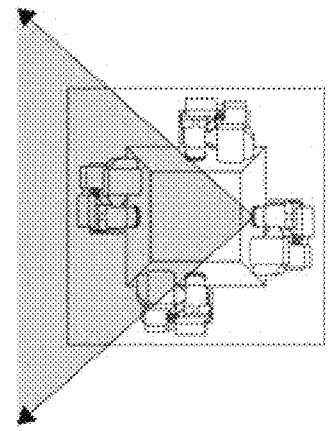
projection region of single optical machine cross-arrangement

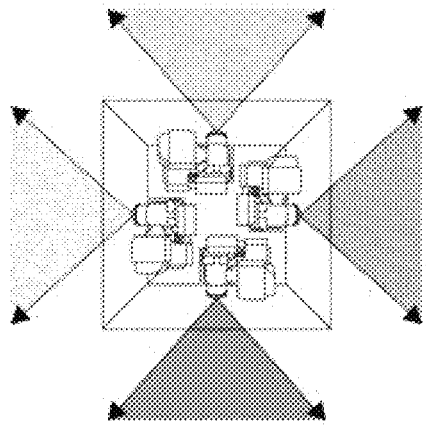
projection region of multiple optical machines non-cross-arrangement a plurality of blank-leaving space in space projection

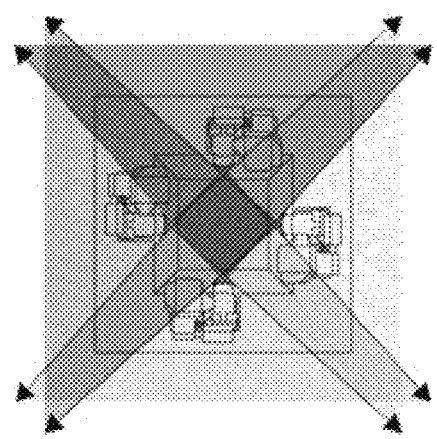
projection region of multiple optical machines cross-arrangement a plurality of blank-leaving space in space projection

FIG. 6

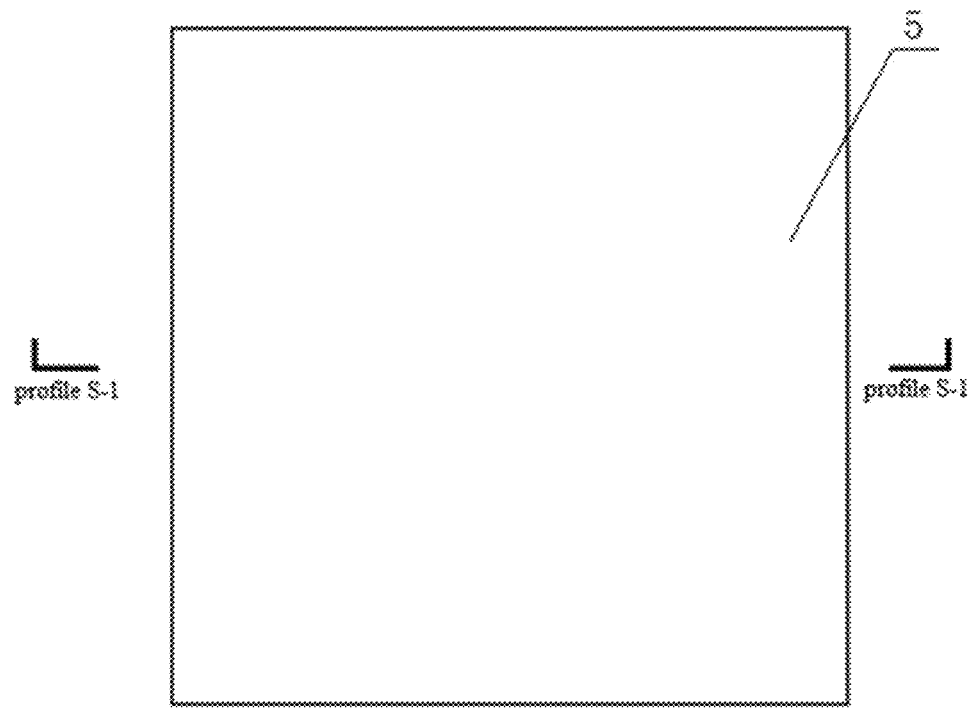
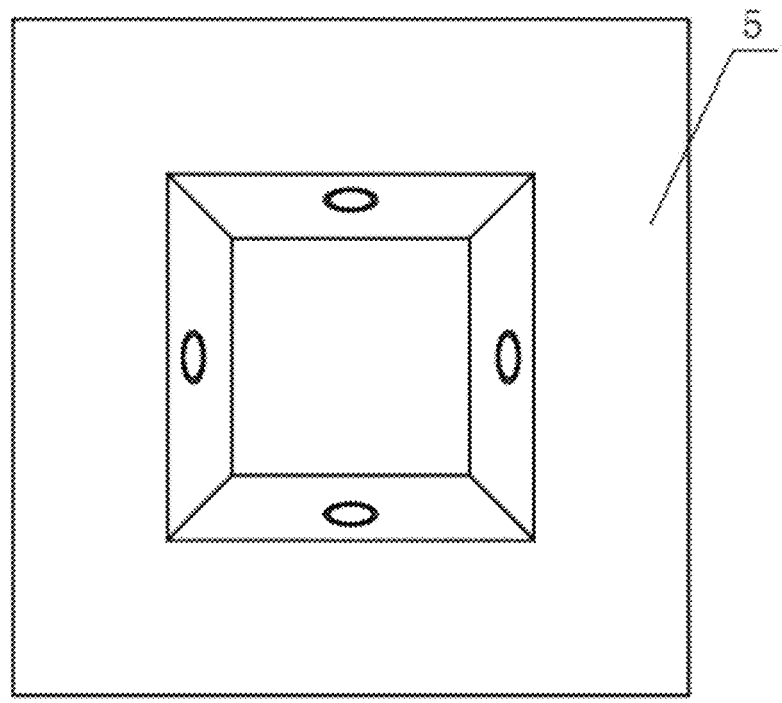
FIG. 7

PROJECTION METHOD, PROJECTION SYSTEM, AND PROJECTOR OF FULLY COVERING MULTI-DIRECTIONAL CIRCULAR-SCREEN THROUGH CROSS-ARRANGEMENT

CROSS REFERENCE TO RELATED APPLICATIONS

This Non-provisional application is based upon and claims priorities under 35 U.S.C. § 119(a) on Chinese Patent Application No. 201710335742.3 filed on May 12, 2017 and Chinese Patent Application No. 201710909685.5 filed on Sep. 29, 2017, the entire contents of which are hereby incorporated by reference.

TECHNICAL FIELD

The present invention relates to the technical field of imaging processing, and more particularly, to a projection method, a projection system, and a projector of fully covering multi-directional circular-screen through cross-arrangement.

BACKGROUND

A cave automatic virtual environment (CAVE) projection system is a large virtual reality (VR) system (such as VR-Platform CAVE), with a high degree of immersion and interactivity. The CAVE projection system can fuse vision, touch, sound and so on, and can track head movement along 6 degrees of freedom. The principle of a CAVE immersive virtual reality display system is relatively complex. It is based on computer graphics, and perfectly fuses the high-resolution three-dimensional projection display technology, multi-channel visual synchronization technology, three-dimensional computer graphics technology, audio technology, sensor technology and so on together to produce a completely immersive virtual environment surrounded by a three-dimensional projection screen and used by multiple people. At present, real-time high-resolution multi-window content rendering of a complex scene is mainly applied to the CAVE system. The CAVE projection system is a large VR system with the high degree of immersion and interactivity. The CAVE projection system is a highly immersive virtual demonstration environment composed of three or more (including three) hard rear-projection walls. An observer is surrounded by the virtual reality system with a plurality of images, and a plurality of projection surfaces form a virtual space. The common CAVE system projection space is a standard cubic structure, and the four independent projection channels finally form a space continuous projection image.

Currently, the advantage of using the conventional projector with multiple optical machines to achieve the projection in a surrounding manner or in a large range is to meet the requirement for an engineering projector on the projection distance in huge physical space. The conventional projector technically achieves large frame surrounding projection under the household scale space (small and medium space). However, the disadvantage of the conventional projector is that the distance between the projection surface and the optical machine is too short when the projector is used in a smaller micro space; and the conventional projector cannot meet the requirement that the size of the projection surface does not need to use a special optical machine with short focal length, and the conventional projector cannot use an optical machine with common focal length to achieve the frame covering the small space and micro space.

SUMMARY

An objective of the present invention is to provide a projection method, a projection system and a projector of fully covering multi-directional circular-screen through cross-arrangement. The projection method, projection system and projector not only achieve integrated optimization of an optical machine arrangement, but also overcomes the limitations of an optical element of a projector with single optical machine, and additionally solves the problem that a frame is not big enough in the small space and micro space caused by the relative short distance between the optical machine and the circular-screen projection surface through a cross-arrangement way; but also meets the requirement that the size of the projection surface does not need to use a special optical machine with short focal length, and an optical machine with common focal length can be used to achieve the frame covering the small space and micro space.

The present invention provides a projection method of fully covering a multi-directional circular-screen through cross-arrangement including the following steps:

dividing a visual platform to be projected to obtain a circular-screen projection surface, and making each optical machine to be arranged project an image onto the circular-screen projection surface to obtain optical path distance information;

arranging each optical machine to be arranged according to the maximum optical path distance information, and making each optical machine to be arranged project the image onto the corresponding circular-screen projection surface according to an arrangement result, to obtain a first projection coverage range;

adjusting the first projection coverage range according to setting parameters corresponding to each optical machine to be arranged and in accordance with a preset projection surface to obtain a second projection coverage range; and obtaining geometric parameters of each optical machine to be arranged, and calculating the geometric parameters and the second projection coverage range to obtain a spatial position and a rotation angle range of each optical machine to be arranged.

As an implementable way, dividing the visual platform to be projected to obtain the circular-screen projection surface may include the following steps:

considering one surface of a cube of the visual platform to be projected as a setting surface, and obtaining preset position information of a center of the setting surface; and dividing the visual platform to be projected according to the preset position information and in accordance with a quadrant to obtain the circular-screen projection surface.

As an implementable way, according to the setting parameters corresponding to each optical machine to be arranged, adjusting the first projection coverage range according to the preset projection surface to obtain the second projection coverage range may include the following steps:

obtaining the setting parameters corresponding to each optical machine to be arranged, and the setting parameters include a throw ratio, a circular-screen projection surface ratio, a vertical ratio and a keystone correction tolerance;

adjusting the first projection coverage range according to the throw ratio, the circular-screen projection surface ratio, the vertical ratio and the keystone correction tolerance, and comparing an adjustment result with the preset projection surface; and if the adjustment result is consistent with the preset projection surface, obtaining the second projection coverage range.

As an implementable way, calculating the geometric parameters and the second projection coverage range to obtain the spatial position and the rotation angle range of the optical machine to be arranged may include the following steps:

adjusting a spatial horizontal position and a rotation angle of each optical machine to be arranged according to the second projection coverage range to calculate whether an optical path coverage range of each optical machine to be arranged is within the circular-screen projection surface; and when the optical path coverage range of the optical path coverage range is within the circular-screen projection surface, outputting the information of the spatial position and the rotation angle range of each optical machine to be arranged according to the geometric parameters of each optical machine to be arranged.

As an implementable way, the projection method of fully covering multi-directional circular-screen through cross-arrangement provided by the present invention may further include the following steps:

after obtaining the first projection coverage range, scanning the circular-screen projection surface to obtain surface horizontal parameters and surface vertical parameters; and adjusting the first projection coverage range according to the setting parameters, the surface horizontal parameters and the surface vertical parameters.

Correspondingly, the present invention further provides a projector of fully covering a cross-arrangement multi-directional circular-screen, including a machine body, a circuit board disposed in the machine body and a power supply disposed on the circuit board, and the projector further includes a plurality of optical machines arranged according to the above-mentioned projection method;

and the optical machines are connected to the circuit board and the power supply, respectively, and are disposed on the circuit board according to the maximum optical path distance information.

As an implementable way, the optical machines may be set in a surrounding manner.

As an implementable way, the number of the optical machines may be four, and the four optical machines may be set to project images onto the corresponding circular-screen projection surface simultaneously when being used for projection.

As an implementable way, the projector of fully covering the cross-arrangement multi-directional circular-screen provided by the present invention may further include a projector spatial position and rotation angle range information output machine; and the projector spatial position and rotation angle range information output machine may be disposed between the optical machines and the circuit board, the circular-screen projection surface includes a plurality of sub-surfaces with the same size during projection, each sub-surface corresponding to one optical machine is projected, fusing zones are formed between the images projected by the optical machines onto corresponding sub-surface screens, and the fusing zones are controlled within a predetermined width according to information of the projector spatial position and rotation angle range.

Correspondingly, the present invention further provides a projection system of fully covering a cross-arrangement multi-directional circular-screen including a visual platform and further including the projector.

Compared with the prior art, the present technical solution has the following advantages:

the present invention provides the projection method, projection system and projector of fully covering multi-directional circular-screen through cross-arrangement. The projection method obtains the circular-screen projection surface by dividing the visual platform to be projected, arranges each optical machine to be arranged according to the maximum optical path distance information that each optical machine to be arranged, projects an image to each circular-screen projection surface to obtain the first projection coverage range, and adjusts the first projection coverage range according to the setting parameters corresponding to each optical machine to be arranged and in accordance with the preset projection surface to obtain the second projection coverage range. The projection method calculates the geometric parameters and the second projection coverage range of each optical machine to be arranged to obtain the spatial position and the rotation angle range of each optical machine to be arranged. The present invention not only achieves the integrated optimization of an optical machine arrangement, but also overcomes the limitation of an optical element of a projector with single optical machine. The present invention also solves the problem that a frame is not big enough in the small space and micro space caused by the relative short distance between the optical machine and the circular-screen projection surface through a cross-arrangement way; The present invention also meets the requirement that the size of the projection surface does not need to use special optical machines with short focal length, and the projector of the present invention can use an optical machine with common focal length to achieve the frame covering the small space and micro space.

For the projector of fully covering multi-directional circular-screen through cross-arrangement provided by the present invention, a single device in the volume and price aspects enters from an engineering level into a household level. The present invention provides a projector which can surround one circle in any space, especially the space of a typical house, and solves the problem that the frame is not big enough in the small space and micro space caused by the relative small distance between the optical machine and the circular-screen projection surface through the cross-arrangement. At the same time the projector of the present invention meets the requirement that the size of the projection surface does not need to use the special optical machine with short focal length, and projector of the present invention can uses the optical machine with common focal length to achieve the frame covering the small space and micro space.

The projection system of fully covering multi-directional circular-screen through cross-arrangement provided by the present invention, includes the visual platform and the projector. The price is at the household level, the installation and deployment are simple, the frame is large and panoramic, and the projection is seamless.

BRIEF DESCRIPTION OF THE DRAWINGS

FIG. 6 is a comparison schematic diagram of a projection geometric region of the cross-arrangement optical machine and the non-cross-arrangement optical machine provided by Embodiment II of the present invention;

FIG. 7 is a top view and a bottom view of a projector of fully covering the cross-arrangement multi-directional circular-screen provided by Embodiment IV of the present invention.

In the figures: 1 circuit board; 2 power supply; 3 optical machine; 4 projector spatial position and rotation angle range information output machine; and 5 machine body.

DETAILED DESCRIPTION

The above-mentioned and other technical features and advantages of the present invention will be clearly and completely described hereinafter with reference to the accompanying drawings. The described embodiments are merely part of the embodiments of the present invention and is not intended to serve as a complete and/or finite listing of the embodiments of the present invention.

Figure 1:
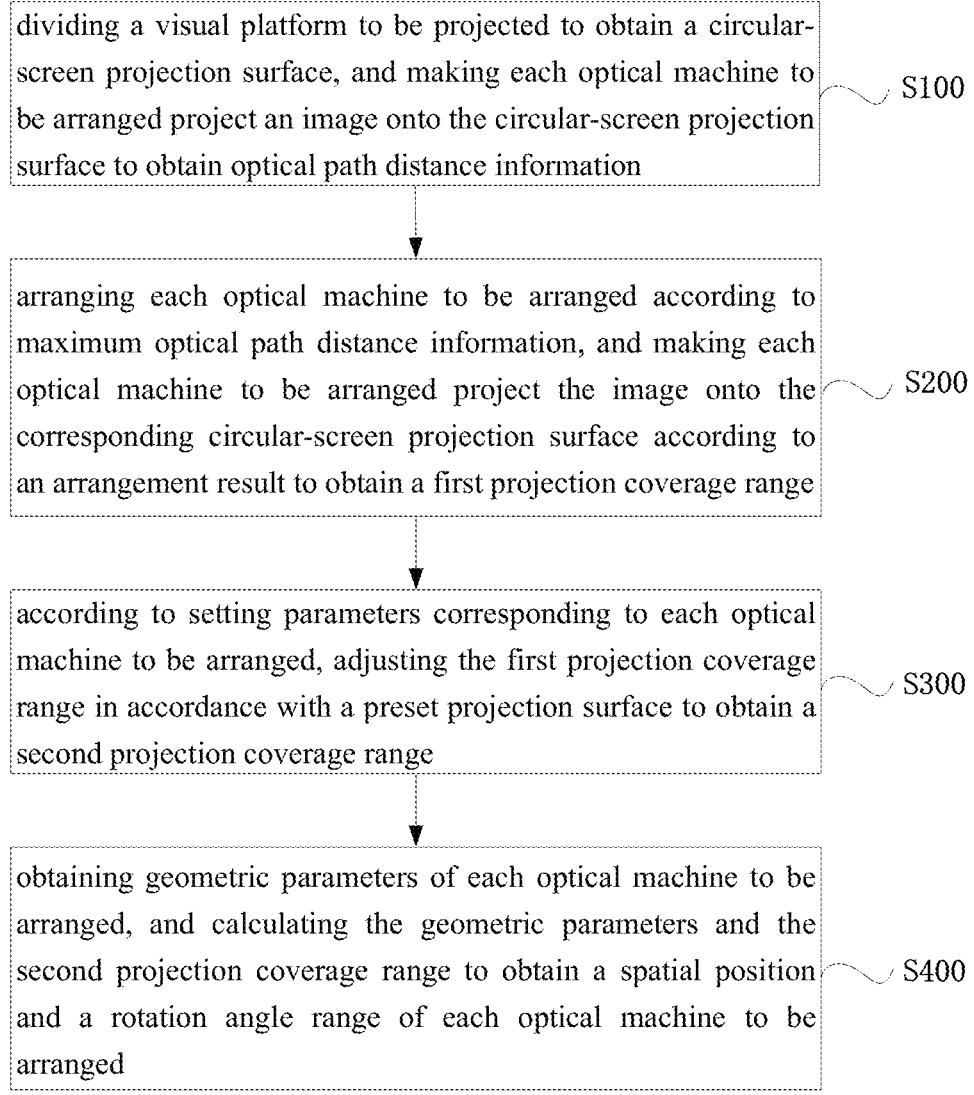
FIG. 1 is a flow schematic diagram of a projection method of fully covering multi-directional circular-screen through cross-arrangement provided by Embodiment I of the present invention.

Please refer to FIG. 1, a projection method of fully covering multi-directional circular-screen through cross-arrangement provided by Embodiment I of the present invention includes the following steps:

S100 dividing a visual platform to be projected to obtain a circular-screen projection surface, and making each optical machine to be arranged project an image onto the circular-screen projection surface to obtain optical path distance information;

S200 arranging each optical machine to be arranged according to maximum optical path distance information, and making each optical machine to be arranged project the image onto the corresponding circular-screen projection surface according to an arrangement result to obtain a first projection coverage range;

S300 adjusting the first projection coverage range according to setting parameters corresponding to each optical machine to be arranged and in accordance with a preset projection surface to obtain a second projection coverage range; and S400 obtaining geometric parameters of each optical machine to be arranged, and calculating the geometric parameters and the second projection coverage range to obtain a spatial position and a rotation angle range of each optical machine to be arranged.

It should be noted that, each optical machine to be arranged has a one-to-one corresponding relationship with the circular-screen projection surface, that is, one optical machine projects the image correspondingly to one circular-screen projection surface. The optical path distance information is a vertical distance that the optical machine projects the image to the corresponding circular-screen projection surface. The optical path distance information that one optical machine projects the image onto each circular-screen projection surface is compared and the maximum optical path distance information is selected. The corresponding optical machine is arranged according to the maximum optical path distance information. Each optical machine to be arranged is previously calculated and arranged according to the above-mentioned steps to obtain the first projection coverage range; and of course, the spatial position and rotation angle of the arranged optical machine are not final. For example, the optical machine at the left side projects the image onto the circular-screen projection surface at the right side, while the optical machine at the right side projects the image onto the circular-screen projection surface at the left side, so as to increase the distance between the optical machine and the wall surface. The number of the circular-screen projection surfaces is at least three. Preferably, the number of the projection surfaces is four, that is, the number of the correspondingly optical machines to be arranged is four.

The first projection coverage range may be of two kinds. The first kind is that one optical machine projects the image onto the corresponding circular-screen projection surface to form a projection surface, and then the first projection coverage range is adjusted according to the setting parameters corresponding to each optical machine to be arranged and in accordance with the preset projection surface. The first projection coverage range needs to be sequentially adjusted one by one until the adjustment of all the first projection coverage is completed. For example, the first projection coverage range is calculated within the set circular-screen projection surface according to the basic parameters such as the throw ratio, circular-screen projection surface ratio, vertical ratio, keystone correction tolerance and so on. The calculation process is carried out in sequence. A vertical surface (screen) of one of the circular-screen projection surfaces is selected, and the spatial position of the optical machine in a corresponding region is determined according to the first projection coverage range; and the calculation of the other circular-screen projection surfaces are completed one by one after completing the calculation of the current wall surface. The second kind is that all optical machines project the images onto the corresponding circular-screen projection surfaces to form the projection surface; and the first projection coverage range formed by the projection of all the optical machines is adjusted at the same time to obtain the second projection coverage range. The second projection coverage range is a geometrical coverage region of the optical path three-dimensional space. The projection screen is not limited to a continuous image in a complete surrounding manner. In the geometrical coverage region of the optical path three-dimensional space, the projection image can be arranged as any size and at any position.

The geometric parameters of each optical machine to be arranged include a size parameter of each optical machine to be arranged, a size parameter of the circuit board disposed in each optical machine, and a size parameter of the projector spatial position and rotation angle range information output machine. The final arrangement position and the final arrangement angle of the optical machine are calculated according to the size parameter of each optical machine to be arranged, the size parameter of the circuit board disposed in each optical machine, the size parameter of the projector spatial position and rotation angle range information output machine, and the second projection coverage range to generate the spatial position and the rotation angle range.

The present invention provides the projection method, projection system, and projector of fully covering multi-directional circular-screen through cross-arrangement. The projection method obtains the circular-screen projection surface by dividing the visual platform to be projected, arranges each optical machine to be arranged according to the maximum optical path distance information that each optical machine to be arranged projects the image onto each circular-screen projection surface to obtain the first projection coverage range, adjusts the first projection coverage range according to the setting parameters corresponding to each optical machine to be arranged and in accordance with the preset projection surface to obtain the second projection coverage range; and calculates the geometric parameters and the second projection coverage range of each optical machine to be arranged to obtain the spatial position and the rotation angle range of each optical machine to be arranged. The present invention not only achieves the integrated optimization of an optical machine arrangement, overcomes the limitation of an optical element of a projector with single optical machine, but also solves the problem that a frame is not big enough in the small space and micro space caused by the relative short distance between the optical machine and the circular-screen projection surface through a cross-arrangement way. The present invention further meets the requirement that the size of the projection surface does not need to use a special optical machine with short focal length, and can use an optical machine with common focal length to achieve the frame covering the small space and micro space.

Figure 2:
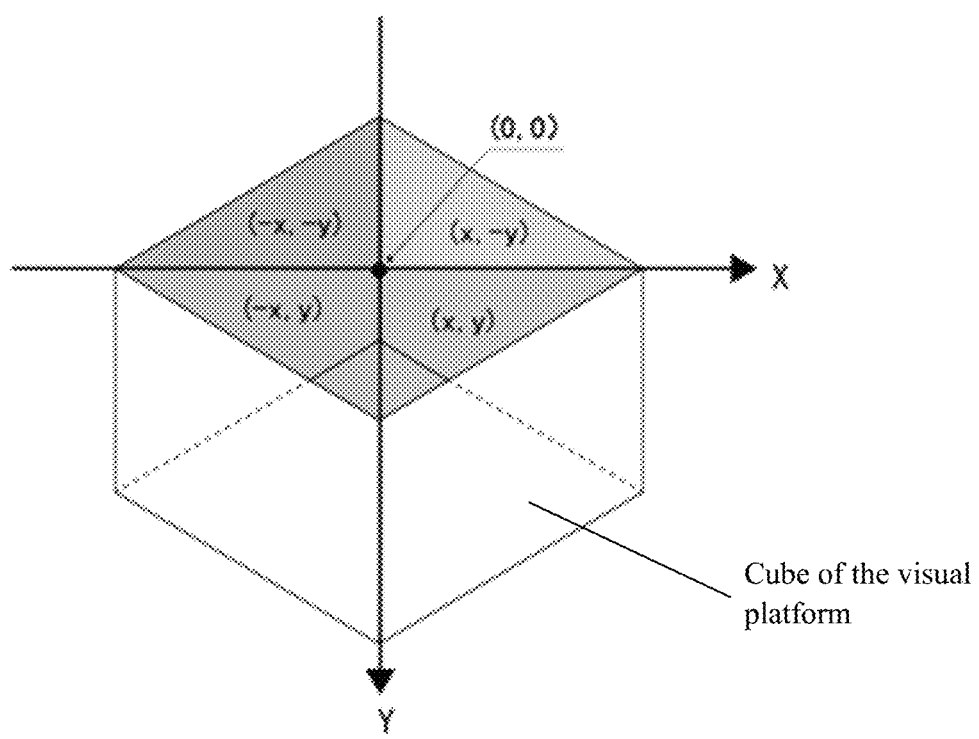
FIG. 2 is a schematic diagram of dividing a visual platform to be projected provided by Embodiment II of the present invention.

FIG. 2 is a schematic diagram of dividing the visual platform to be projected which includes the following steps:

S110 considering one surface of a cube of the visual platform to be projected as a setting surface, and obtaining preset position information of a center of the setting surface; and S120 dividing the visual platform to be projected according to the preset position information and in accordance with a quadrant to obtain the circular-screen projection surface.

The center of the setting surface can refer to the origin (0, 0) in FIG. 2. The specific process of the above-mentioned steps is as follows: the origin is regarded as the center of the setting surface, that is, the preset position information is (0, 0) and is developed one by one according to quadrants in four directions (x, y), (x, −y), (−x, −y), (−x, y); and that is, the visual platform to be projected is developed into four circular-screen projection surfaces one by one.

Figure 3:
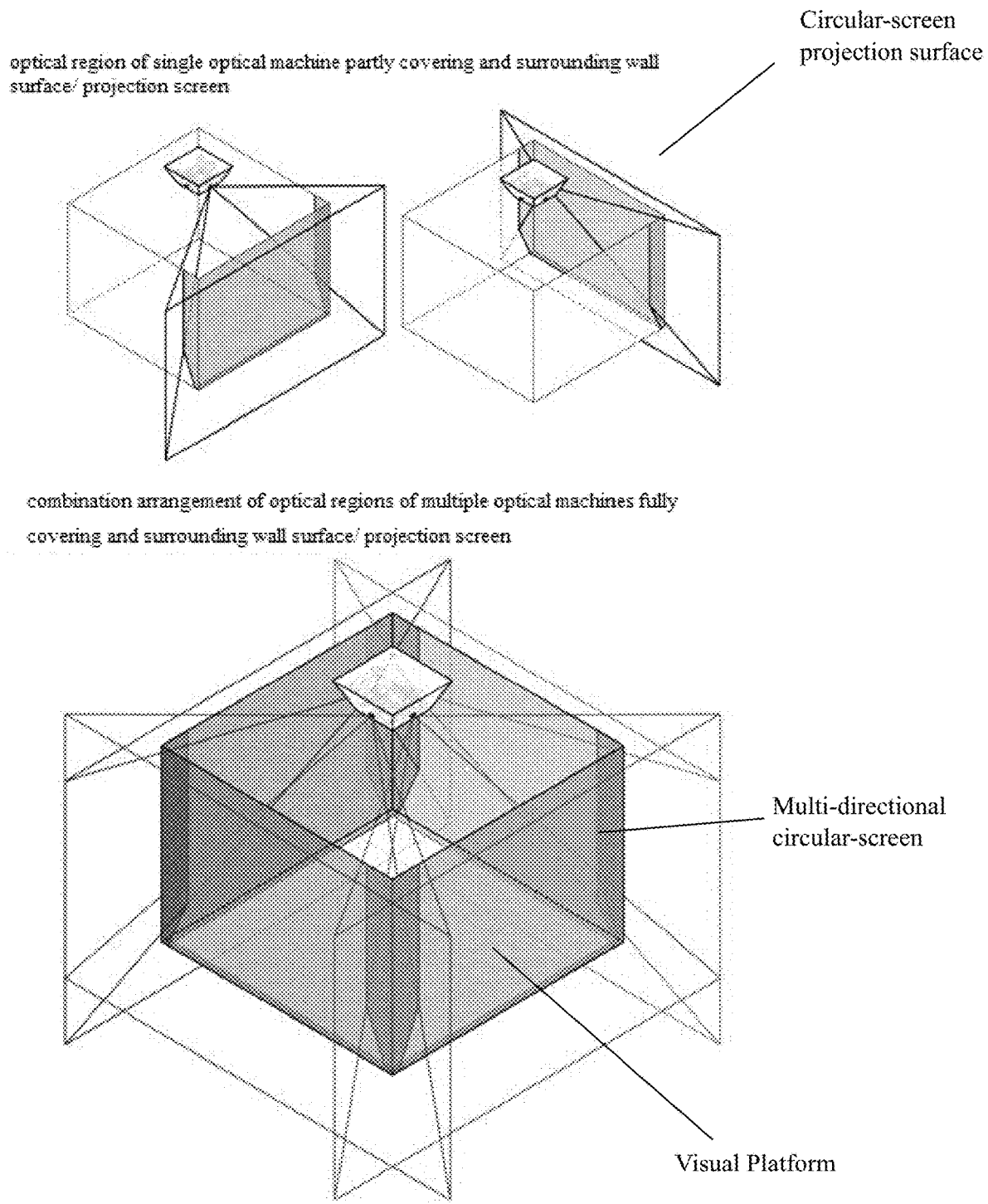
FIG. 3 is a three-dimensional schematic diagram of a calculating process of a spatial position and a rotation angle range of an optical machine to be arranged provided by Embodiment II of the present invention.
Figure 4:
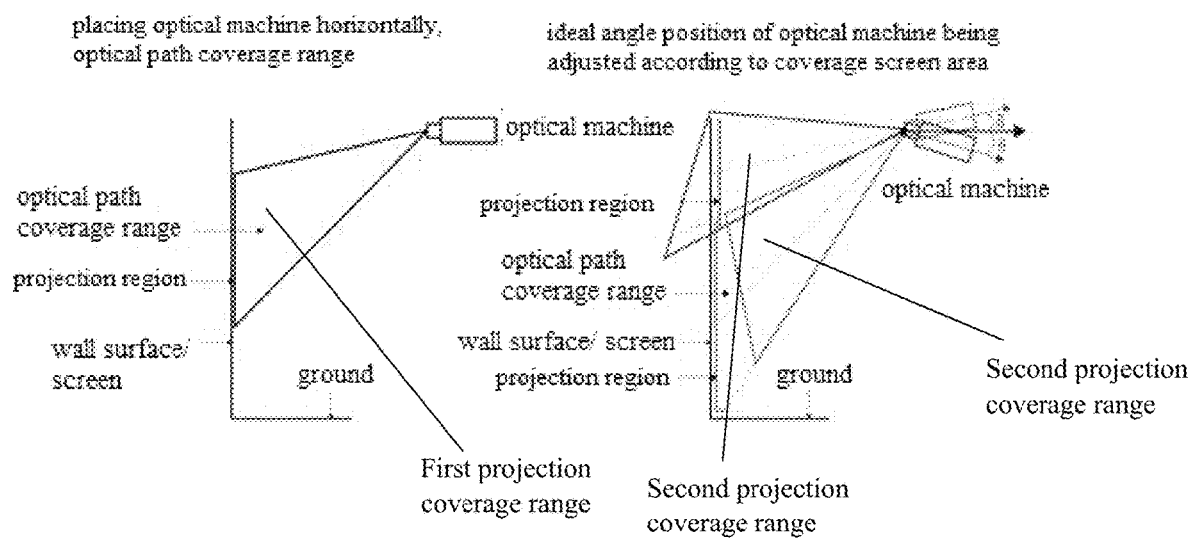
FIG. 4 is a plane schematic diagram of the calculating process of the spatial position and the rotation angle range of the optical machine to be arranged provided by Embodiment II of the present invention.

Further, the calculation process of the spatial position and the rotation angle range of each optical machine to be arranged is described in detail, which is shown as FIG. 3 and FIG. 4.

According to the setting parameters corresponding to each optical machine to be arranged, adjusting the first projection coverage range according to the preset projection surface to obtain the second projection coverage range includes the following steps:

S310 obtaining the setting parameters corresponding to each optical machine to be arranged, and the setting parameters include a throw ratio, a circular-screen projection surface ratio, a vertical ratio, and a keystone correction tolerance;

S320 adjusting the first projection coverage range according to the throw ratio, the circular-screen projection surface ratio, the vertical ratio and the keystone correction tolerance, and comparing an adjustment result with the preset projection surface; and S330 if the adjustment result is consistent with the preset projection surface, obtaining the second projection coverage range.

It should be noted that, the preset projection surface is the projection image that needs to be exhibited on the screen in practical applications. Through the adjustment of the first projection coverage range by setting the parameters, the exhibited projection image is complete, which meets the requirement of projection and improves the exhibition effect. In addition, a plurality of projection screens which are not limited to the circular-screen can be disposed within the second projection coverage range randomly.

However, calculating the geometric parameters and the second projection coverage range to obtain the spatial position and the rotation angle range of each optical machine to be arranged includes the following steps:

S410 according to the second projection coverage range, adjusting a spatial horizontal position and a rotation angle of each optical machine to be arranged to calculate whether an optical path coverage range of each optical machine to be arranged is within the circular-screen projection surface; and S420 when the optical path coverage range of the optical machine to be arranged is within the circular-screen projection surface, outputting the information of the spatial position and the rotation angle range of each optical machine to be arranged according to the geometric parameters of each optical machine to be arranged.

The second projection coverage range is obtained by calculating according to three-dimensional space modeling. After obtaining the second projection coverage range, the spatial horizontal position and the rotation angle of each optical machine to be arranged are adjusted to calculate the optical path coverage range of each optical machine to be arranged to ensure that the optical path coverage range is within the circular-screen projection surface. In this way, in practical process of arranging the screen, the image can be projected onto the screen arranged in the second projection coverage range only by adjusting the angle. In addition, the final spatial position and the final rotation angle range of the optical machine to be arranged are calculated combining with the geometric parameters of each optical machine to be arranged to output the spatial position and the rotation angle range of each optical machine to be arranged. The present invention can improve the final projection effect of the optical machine, make the screen to be any size, and randomly arrange the screen within the second projection coverage range.

Figure 5:
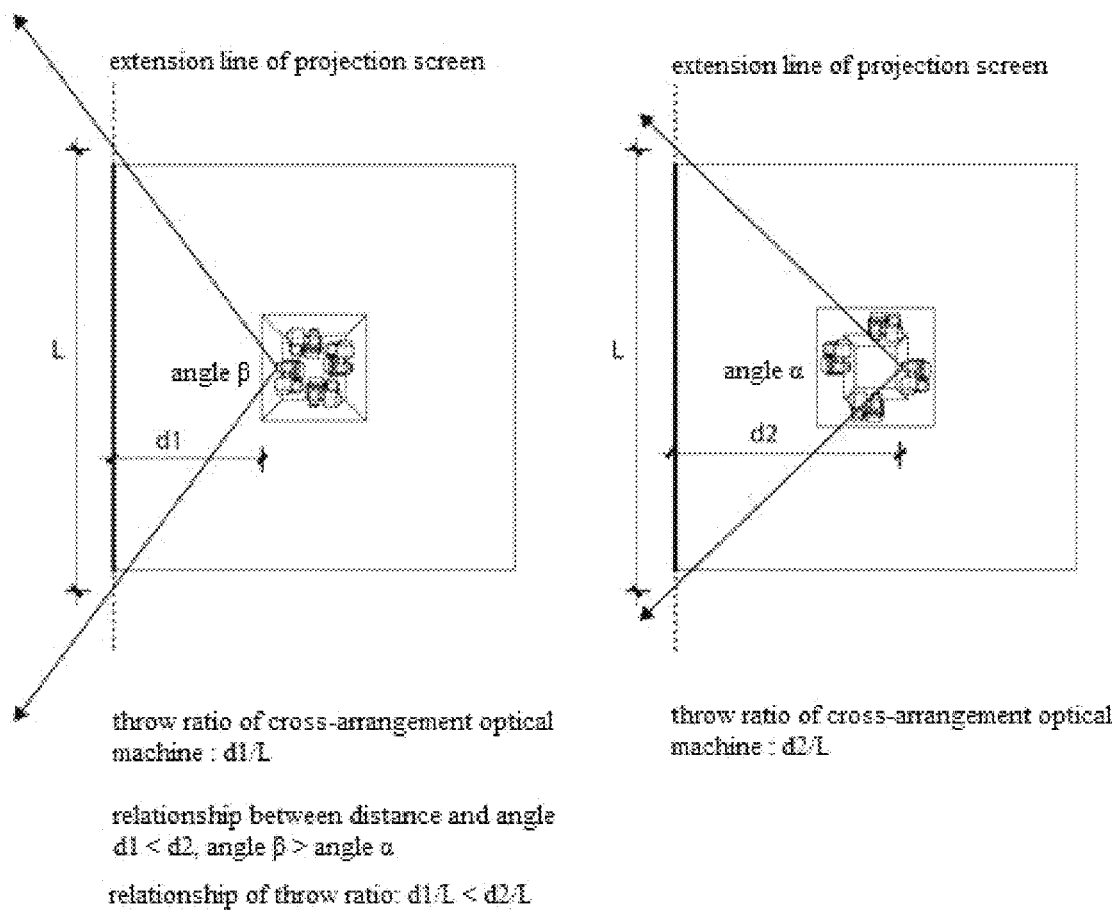
FIG. 5 is a comparison schematic diagram of a throw ratio of a cross-arrangement optical machine and a non-cross-arrangement optical machine provided by Embodiment II of the present invention.

FIG. 5 is a comparison schematic diagram of a cross-arrangement optical machine and a non-cross-arrangement optical machine provided by Embodiment II of the present invention. Under a case that the projection surface is kept the same, a necessary throw ratio d1/L when the optical machine is arranged in a non-cross-arrangement manner is smaller than a needed throw ratio d2/L when the optical machine is arranged in a cross-arrangement manner, and the lens wide-angle is angle β, which is greater than angle α in the cross-arrangement solution. d1 is the distance between the optical machine lens and the projection surface in common optical machine integration. d2 is the distance between the optical machine lens and the projection surface in the cross-arrangement optical machine of the present invention. d2 is greater than d1. L is the length of the projection surface, and W is the width of the wall surface of the circular-screen projection surface. The physical parameters of the optical machine hardware in the two arrangement solutions are exactly the same, and the projection frame after cross-arranging is greatly increased; which is greatly larger than the projection frame in the non-cross-arrangement solution. Under the case that the projection surface is kept the same, the requirement of the parameters of the optical machine in the non-cross-arrangement manner is higher than the requirement of the parameters of the optical machine in the cross-arrangement solution. Under the condition that the non-cross-arrangement optical machine also meets the requirement of the projection surface, the optical machine needs to have a smaller throw ratio, that is, a shorter focal length. At the same time, the optical machine lens need to have a wider wide-angle. On the contrary, under the condition that the projection surface is the same, the physical parameters of the optical machine in the cross-arrangement solution are more generalized, and the hardware requirement of the special parameters is not required. The present invention can reduce the requirements of the optical machine parameters and reduce the costs correspondingly. Under a premise that the projection frame is the same, the present invention has the advantages of low requirement of the physical parameters of the optical machine and achieving the frame coverage by using a more generalized and universal optical machine, which saves more hardware costs.

FIG. 6 is a comparison schematic diagram of a projection geometric region of the cross-arrangement optical machine and the non-cross-arrangement optical machine provided by Embodiment II of the present invention. Under the case that the parameters of each optical machine are kept the same, the optical path coverage area of the cross-arrangement optical machine is larger. There is a plurality of blank-leaving in the non-arrangement projection region. Blank-leaving means that no optical path of any optical machine passes through and covers the projection region. In the blank region, any projection screen cannot be arranged. In the cross-arrange optical machine solution, multiple optical paths overlapping and covering all the blank regions can be obviously seen, so that the projection screen can be placed anywhere in the covered region, that is to say, the projection screen has more freedom. In the non-cross-arrangement optical machine solution, if the blank regions need to be reduced, more optical machines need to be arranged to cover the space. In other words, the cross-arrangement optical machine solution can achieve a same effect with less optical machine. Under the condition that the parameters of each optical machine are exactly the same, when fully covering the circular-screen is achieved, a larger geometric space coverage area is obtained. There is no blank region between the optical paths of the multiple optical machines, the projection screen of any size and at any position can be arranged in the optical path coverage region.

Combining with FIG. 2 to FIG. 8, in applications of the technical solution of the present invention, a basic process includes three parts: an optical machine spatial position calculation, a second projection coverage range calculation and a geometric parameters and second projection coverage range calculation.

The optical machine spatial position calculation includes:
the origin (0, 0) being regarded as the preset position information and being developed one by one according to quadrants in four directions (x, y), (x, −y), (−x, −y), (−x, y); and that is, the visual platform to be projected being developed into four circular-screen projection surfaces one by one. Selecting one vertical surface (screen) in one of the quadrants, first scanning the horizontal direction and the vertical direction, and determining an object coverage range as a choice basis of the corresponding optical machine to be arranged. Circular-screen projection surfaces in other quadrants can be deduced like this one by one to obtain the first projection coverage.

The second projection coverage range calculation includes:
adjusting the first projection coverage range according to the setting parameters corresponding to each optical machine to be arranged and in accordance with the preset projection surface to obtain the second projection coverage range; and by inversely deducing the projection region of the first projection coverage range on the screen, an ideal position and the rotation angle on the horizontal plane of the coordinate optical machine being obtained. Then basic parameters such as the throw ratio, the circular-screen projection surface ratio, the vertical ratio, the keystone correction tolerance and so on are taken as adjustment bases.

The rotation angle θ (see FIG. 4) between the optical machine and the horizontal plane is obtained according to the projection region in the same way.

Figure 8:
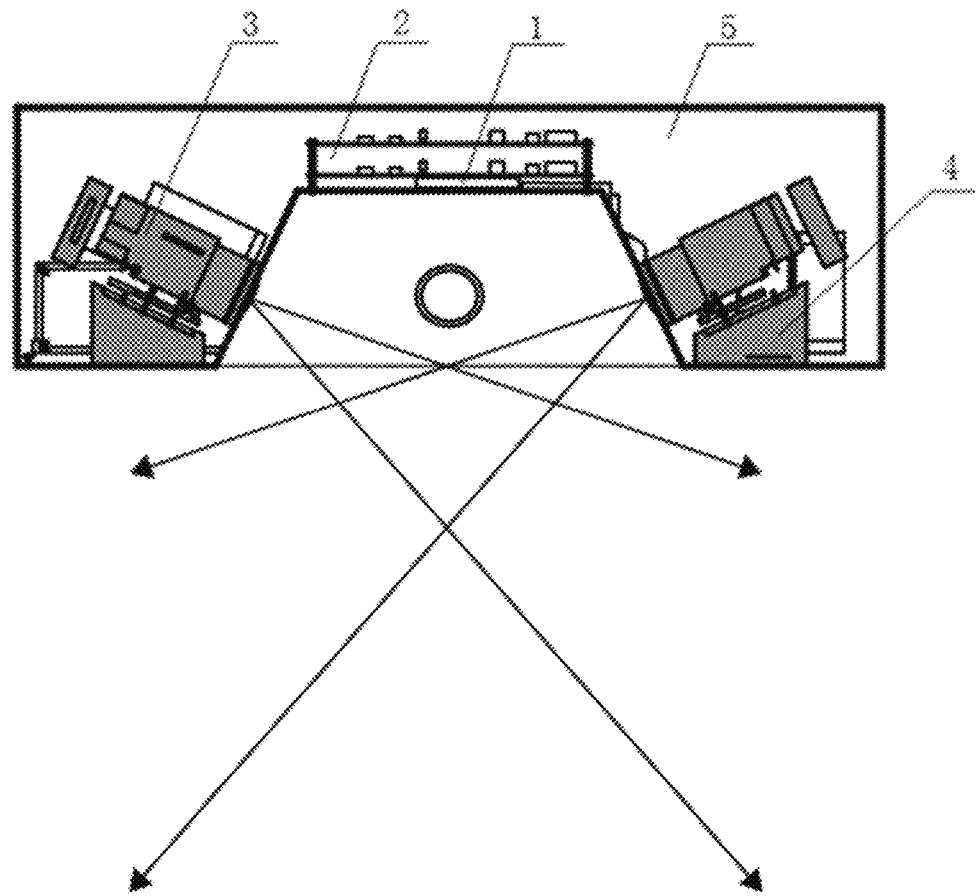
FIG. 8 is a side view and a section view of the projector in FIG. 7.

A result of the geometric parameters and second projection coverage range calculation can refer to FIG. 7 and FIG. 8. Through the optical machine spatial position calculation and the transformation of the throwratio, combining with restrictions such as the physical size of the optical machine, the spatial condition of the projected optical path and so on, the equipment is overall arranged and optimized, and the construction met the requirement of the size design is selected and exported. Finally, the information of the spatial position and the spatial rotation angle of all four optical machines are exported.

Further, the projection method of fully covering multi-directional circular-screen through cross-arrangement provided by Embodiment III of the present invention further includes the following steps compared with Embodiment I:
after obtaining the first projection coverage range, scanning the circular-screen projection surface to obtain surface horizontal parameters and surface vertical parameters; and
adjusting the first projection coverage range according to the setting parameters, the surface horizontal parameters and the surface vertical parameters.

Based on the same inventive concept, the embodiments of the present invention further provide a projector of fully covering a cross-arrangement multi-directional circular-screen. The projector can be implemented according to the above-mentioned method, and the repetition is not described.

FIG. 7 and FIG. 8 are disassembly schematic diagrams of a projector of fully covering a cross-arrangement multi-directional circular-screen provided by Embodiment IV of the present invention. The projector includes a machine body 5, a circuit board 1 disposed in the machine body 5, a power supply 2 disposed on circuit board 1 and a plurality of optical machines 3 arranged according to the projection method of fully covering multi-directional circular-screen through cross-arrangement. Optical machines 3 are connected with circuit board 1 and power supply 2, respectively, and are disposed on circuit board 1 according to the maximum optical path distance information. Machine body 5 is provided with a projection port, and the projection port is correspondingly arranged with optical machine 3 for the projection.

For the projector of fully covering the cross-arrangement multi-directional circular-screen provided by the present invention, a single device in the volume and price aspects enters from an engineering level into a household level. The present invention provides the projector which can surround one circle in any space, especially in the household scale space, and solves the problem that the frame is not big enough in the small space and micro space caused by the relative short distance between the optical machine and the circular-screen projection surface through the cross-arrangement way. At the same time, the projector of the present invention meets the requirement that the size of the projection surface does not need to use the special optical machine with short focal length, and the optical machine with common focal length can be used to achieve the frame covering the small space and micro space.

Further, the optical machines 3 are set in a surrounding manner. Single equipment can replace multiple equipment to disperse the space arrangement, reduce the arrangement space, improve a space utilization rate, and achieve a good projection effect.

Further, the number of optical machines 3 is four. The four optical machines 3 are set to project images onto the corresponding circular-screen projection surfaces simultaneously when used for projection. The number of optical machines is 4 and is not limited to 4, and the resolution unit of each optical machine is 2K. The volume of the projector in the present invention is only ¼ of that in the existing solution, the power consumption is only half of that in the existing solution, and a single projector in the volume and price aspects enters from an engineering level into a household level. The installation and deployment are simple, the frame is large format, panoramic, and seamless.

Further, the projector of fully covering the cross-arrangement multi-directional circular-screen provided by Embodiment V of the present invention further includes a projector spatial position and rotation angle range information output machine 4. The projector spatial position and rotation angle range information output machine 4 is disposed between the optical machines 3 and the circuit board 1. The circular-screen projection surface includes a plurality of sub-surfaces with the same size during projection, and each sub-surface corresponding to one optical machine 3 is projected. Fusing zones are formed between the images projected by the optical machines 3 onto the corresponding sub-surface screens, and the fusing zones are controlled within a predetermined width according to information of the projector spatial position and rotation angle range.

It should be noted that the projector spatial position and rotation angle range information output machine 4 is a spatial angle supporting frame of the optical machine, which makes the optical machine 3 on the supporting frame be arranged according to the spatial position and rotation angle range. The fusing zone does not necessarily exist. Fusing zones are formed between the images projected by the optical machines 3 onto the corresponding sub-surface screens, and the fusing zones are controlled within a predetermined width according to information of the projector spatial position and rotation angle range. The spacing therefore allows the projection screen to not be limited to the continuous image in the complete surrounding manner. In the geometrical coverage region of the optical path three-dimensional space, the projection screen can be arranged as any size and at any position.

Based on the same inventive concept, the embodiments of the present invention further provide a projection system of fully covering cross-arrangement multi-directional circular-screen. The system can be implemented according to the above-mentioned method, and the repetition is not described.

The projection system of fully covering cross-arrangement multi-directional circular-screen provided by the present invention, includes the visual platform and the projector. The price is at the household level, the installation and deployment are simple, the frame is large and panoramic, and the projection is seamless.

Although the present invention has been described in considerable detail with reference to certain preferred embodiments thereof, the disclosure is not for limiting the scope of the invention. Those skilled in the art may make various modifications and changes without departing from the scope and spirit of the present invention. Therefore, any simple modifications, equivalent changes and modifications made to the above-mentioned embodiments according to the technical essence of the present invention without departing from the content of the technical solution of the present invention shall fall within the scope of the technical scheme of the present invention.

What is claimed is:

1. A projection method of fully covering multi-directional circular-screen through cross-arrangement, comprising the following steps:

dividing a visual platform to be projected to obtain a circular-screen projection surface, and making each of a plurality of optical machines to be arranged project an image onto the circular-screen projection surface to obtain optical path distance information;

arranging each of the plurality of optical machines to be arranged according to maximum optical path distance information, and making each of the plurality of optical machines to be arranged project the image onto the corresponding circular-screen projection surface according to an arrangement result to obtain a first projection coverage range;

adjusting the first projection coverage range according to setting parameters corresponding to each of the plurality of optical machines to be arranged and in accordance with a preset projection surface to obtain a second projection coverage range; and obtaining geometric parameters of each of the plurality of optical machines to be arranged, and calculating the geometric parameters and the second projection coverage range to obtain a spatial position and a rotation angle range of each of the plurality of optical machines to be arranged.

2. The projection method of fully covering multi-directional circular-screen through cross-arrangement according to claim 1, wherein dividing the visual platform to be projected to obtain the circular-screen projection surface comprises the following steps:

considering one surface of a cube of the visual platform to be projected as a setting surface, and obtaining preset position information of a center of the setting surface; and according to the preset position information, dividing the visual platform to be projected in accordance with a quadrant to obtain the circular-screen projection surface.

3. The projection method of fully covering multi-directional circular-screen through cross-arrangement according to claim 1, wherein adjusting the first projection coverage range according to the setting parameters corresponding to each of the plurality of optical machines to be arranged and in accordance with the preset projection surface to obtain the second projection coverage range comprises the following steps:

obtaining the setting parameters corresponding to each of the plurality of optical machines to be arranged, and the setting parameters comprising a throw ratio, a circular-screen projection surface ratio, a vertical ratio and a keystone correction tolerance;

adjusting the first projection coverage range according to the throw ratio, the circular-screen projection surface ratio, the vertical ratio and the keystone correction tolerance, and comparing an adjustment result with the preset projection surface; and if the adjustment result is consistent with the preset projection surface, obtaining the second projection coverage range.

4. The projection method of fully covering multi-directional circular-screen through cross-arrangement according to claim 1, wherein calculating the geometric parameters and the second projection coverage range to obtain the spatial position and the rotation angle range of the plurality of optical machines to be arranged comprises the following steps:

adjusting a spatial horizontal position and a rotation angle of each of the plurality of optical machines to be arranged according to the second projection coverage range to calculate whether an optical path coverage range of each of the plurality of optical machines to be arranged is within the circular-screen projection surface; and when the optical path coverage range of the plurality of optical machines to be arranged is within the circular-screen projection surface, outputting the information of the spatial position and the rotation angle range of each of the plurality of optical machines to be arranged according to the geometric parameters of each of the plurality of optical machines to be arranged.

5. The projection method of fully covering multi-directional circular-screen through cross-arrangement according to claim 1, further comprising the following steps:

after obtaining the first projection coverage range, scanning the circular-screen projection surface to obtain surface horizontal parameters and surface vertical parameters; and adjusting the first projection coverage range according to the setting parameters, the surface horizontal parameters and the surface vertical parameters.

6. A projector of fully covering the multi-directional circular-screen though cross-arrangement, comprising a machine body, a circuit board disposed in the machine body and a power supply disposed on the circuit board, wherein the projector further comprises the plurality of optical machines arranged according to the projection method of claim 1;

the plurality of optical machines are connected to the circuit board and the power supply, respectively, and is disposed on the circuit board according to the maximum optical path distance information.

7. The projector of fully covering multi-directional circular-screen through cross-arrangement according to claim 6, wherein the plurality of optical machines are set in a surrounding manner.

8. The projector of fully covering multi-directional circular-screen through cross-arrangement according to claim 7, wherein the number of the plurality of optical machines is four, and the four optical machines are set to project images to the corresponding circular-screen projection surface simultaneously when used for projection.

9. The projector of fully covering multi-directional circular-screen through cross-arrangement according to claim 6, further comprising a projector spatial position and rotation angle range information of output machine; wherein the projector spatial position and rotation angle range information of the output machine is disposed between the plurality of optical machines and the circuit board, the circular-screen projection surface comprises a plurality of sub-surfaces with the same size during projection, each sub-surface is projected corresponding to one optical machine of the plurality of optical machines, fusing zones are formed between the images projected by the plurality of optical machines onto corresponding sub-surface screens, and the fusing zones are controlled within a predetermined width according to information of the projector spatial position and rotation angle range.

10. A projection system of fully covering the multi-directional circular-screen through cross-arrangement comprising the visual platform and further comprising the projector as claimed in claim 6.

11. The projector of fully covering multi-directional circular-screen through cross-arrangement according to claim 6, wherein dividing the visual platform to be projected to obtain the circular-screen projection surface comprises the following steps:

considering one surface of a cube of the visual platform to be projected as a setting surface, and obtaining preset position information of a center of the setting surface; and according to the preset position information, dividing the visual platform to be projected in accordance with a quadrant to obtain the circular-screen projection surface.

12. The projector of fully covering multi-directional circular-screen through cross-arrangement according to claim 6, wherein adjusting the first projection coverage range according to the setting parameters corresponding to each of the plurality of optical machines to be arranged, and in accordance with the preset projection surface to obtain the second projection coverage range comprises the following steps:

obtaining the setting parameters corresponding to each of the plurality of optical machines to be arranged, and the setting parameters comprising a throw ratio, a circular-screen projection surface ratio, a vertical ratio and a keystone correction tolerance;

adjusting the first projection coverage range according to the throw ratio, the circular-screen projection surface ratio, the vertical ratio and the keystone correction tolerance, and comparing an adjustment result with the preset projection surface; and if the adjustment result is consistent with the preset projection surface, obtaining the second projection coverage range.

13. The projector of fully covering multi-directional circular-screen through cross-arrangement according to claim 6, wherein calculating the geometric parameters and the second projection coverage range to obtain the spatial position and the rotation angle range of the plurality of optical machines to be arranged comprises the following steps:

adjusting a spatial horizontal position and a rotation angle of each of the plurality of optical machines to be arranged according to the second projection coverage range to calculate whether an optical path coverage range of each of the plurality of optical machines to be arranged is within the circular-screen projection surface; and when the optical path coverage range of the plurality of optical machines to be arranged is within the circular-screen projection surface, outputting the information of the spatial position and the rotation angle range of each of the plurality of optical machines to be arranged according to the geometric parameters of each of the plurality of optical machines to be arranged.

14. The projector of fully covering multi-directional circular-screen through cross-arrangement according to claim 6, further comprising the following steps:
   after obtaining the first projection coverage range, scanning the circular-screen projection surface to obtain surface horizontal parameters and surface vertical parameters; and
   adjusting the first projection coverage range according to the setting parameters, the surface horizontal parameters and the surface vertical parameters.

15. The projection system of fully covering multi-directional circular-screen through cross-arrangement according to claim 10, wherein the plurality of optical machines are set in a surrounding manner.

16. The projection system of fully covering multi-directional circular-screen through cross-arrangement according to claim 15, wherein the number of the plurality of optical machines is four, and the four optical machines are set to project images to the corresponding circular-screen projection surface simultaneously when used for projection.

17. The projection system of fully covering multi-directional circular-screen through cross-arrangement according to claim 10, further comprising a projector spatial position and rotation angle range information output machine; wherein
   the projector spatial position and rotation angle range information output machine is disposed between the plurality of optical machines and the circuit board, the circular-screen projection surface comprises a plurality of sub-surfaces with the same size during projection, each sub-surface is projected corresponding to one optical machine of the plurality of optical machines, fusing zones are formed between the images projected by the plurality of optical machines onto corresponding sub-surface screens, and the fusing zones are controlled within a predetermined width according to information of the projector spatial position and rotation angle range.

* * * * *